L. J. E. COLARDEAU & J. RICHARD.
STEREOSCOPIC APPARATUS.
APPLICATION FILED NOV. 26, 1913.
1,256,774.
Patented Feb. 19, 1918.
4 SHEETS—SHEET 1.
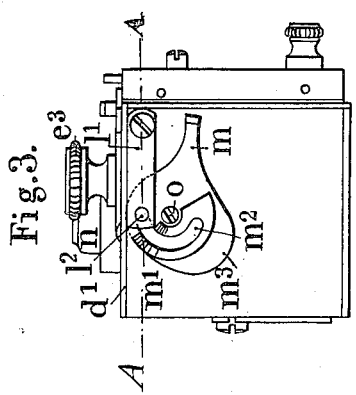
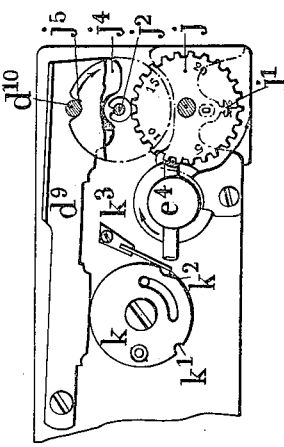
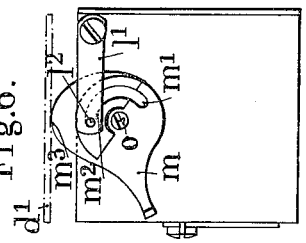
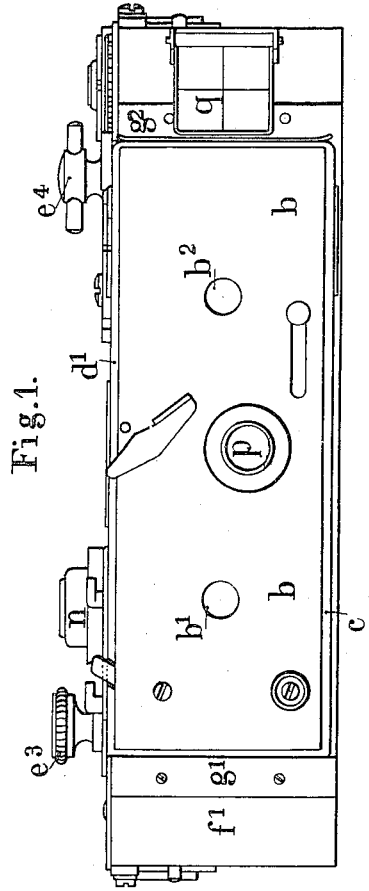
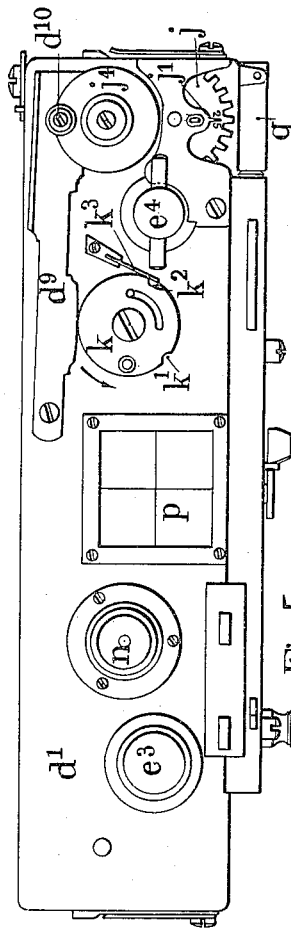
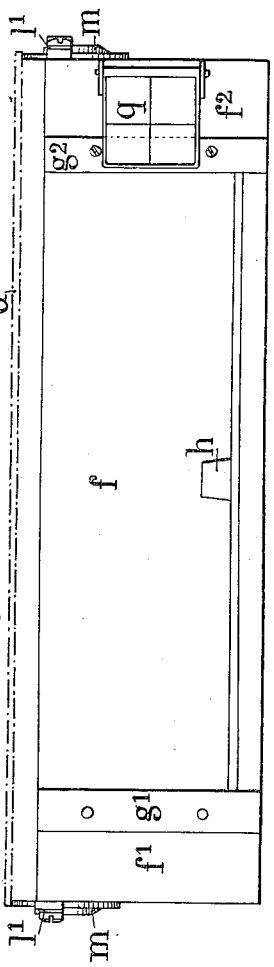
Witnesses:
M. J. Whittaker
H. M. Hulst
Inventor:
L. J. E. Colardeau
J. Richard
by H. W. Washorn
Attorney.

L. J. E. COLARDEAU & J. RICHARD.
STEREOSCOPIC APPARATUS.
APPLICATION FILED NOV. 26, 1913.
1,256,774.
Patented Feb. 19, 1918.
4 SHEETS—SHEET 2.
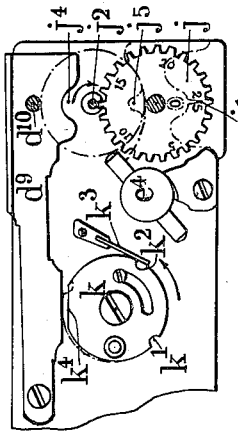
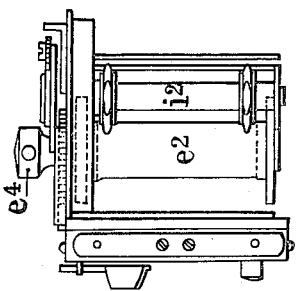
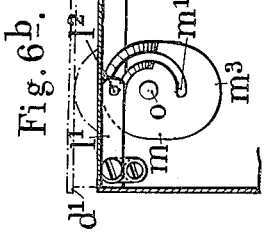
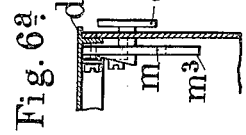
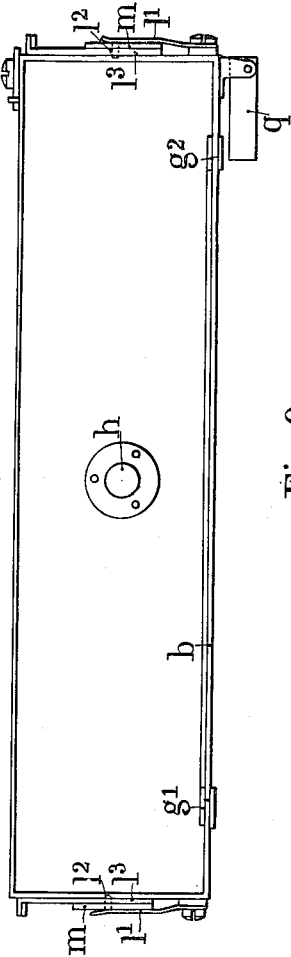
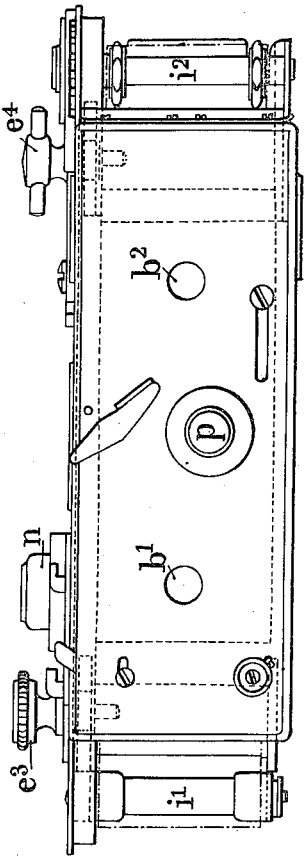
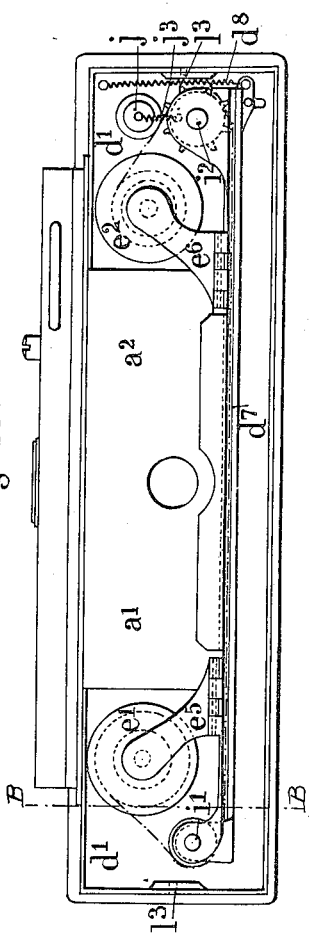
Witnesses:
Inventor:
Attorney.

L. J. E. COLARDEAU & J. RICHARD.
STEREOSCOPIC APPARATUS.
APPLICATION FILED NOV. 26, 1913.
1,256,774.
Patented Feb. 19, 1918.
4 SHEETS—SHEET 4.
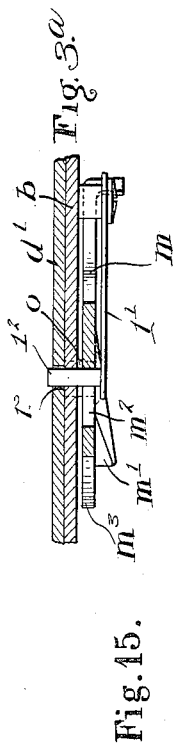
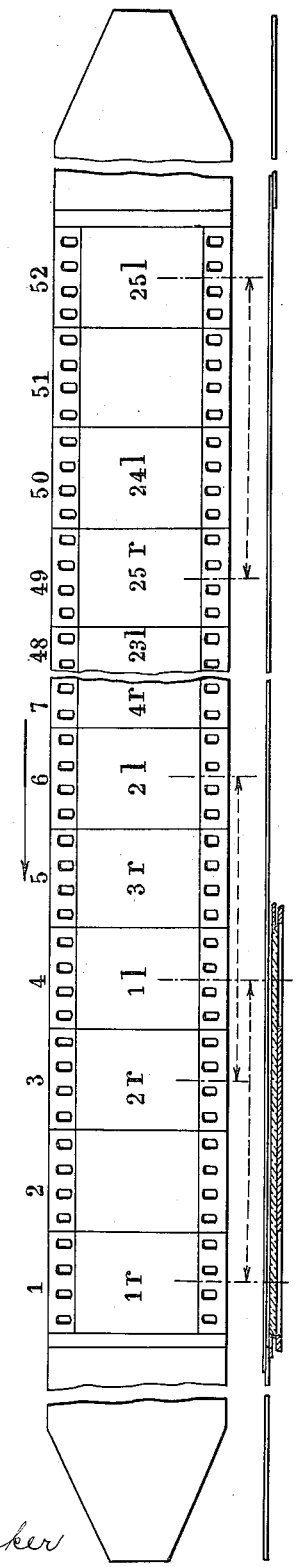
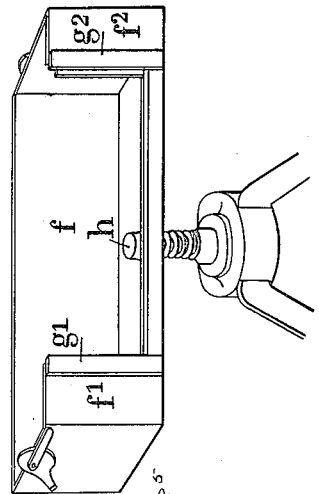
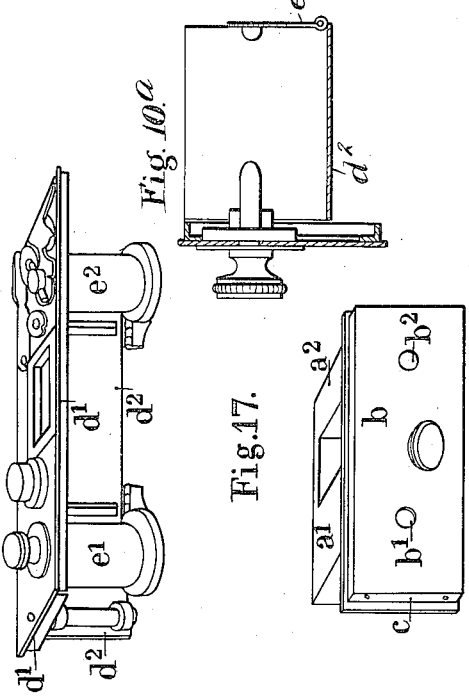

UNITED STATES PATENT OFFICE.

LOUIS JOSEPH EMMANUEL COLARDEAU AND JULES RICHARD, OF PARIS, FRANCE.

STEREOSCOPIC APPARATUS.

1,256,774.  Specification of Letters Patent.  Patented Feb. 19, 1918.

Application filed November 26, 1913. Serial No. 803,184.

*To all whom it may concern:*

Be it known that we, LOUIS JOSEPH EMMANUEL COLARDEAU and JULES RICHARD, citizens of the Republic of France, residing, respectively, at 13 Rue de Navarin, Paris, and 25 Rue Melingue, Paris, both in the Republic of France, have invented certain new and useful Improvements in or Relating to Stereoscopic Apparatus, of which the following is a specification.

This invention is a photographic apparatus and has for its object to provide improved means for feeding and clamping a film.

The invention is illustrated by way of example in the accompanying drawings, in which:—

Figures 1, 2 and 3 represent the photographic apparatus proper in front elevation, in side elevation and in end elevation respectively.

Fig. 3ᵃ is a detail sectional view on the line A—A, of Fig. 3.

Figs. 4 to 11 represent the several constituent parts of this apparatus and comprise detail views of the mechanism for feeding the film and controlling its passage.

Fig. 10ᵃ is a detail sectional view on the line B—B of Fig. 10.

Fig. 15 shows in plan and in elevation the method of printing the film in the apparatus.

Figs. 16, 17 and 18 are perspective views of the constituent parts of the photographic apparatus proper.

Figure 12:
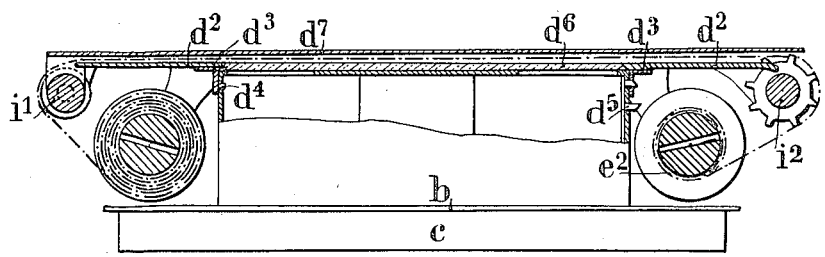
Figs. 12, 13 and 14 illustrate in section the mechanism for winding and unwinding the film in the photographic apparatus.

As shown in Figs. 1 to 14 and 16 to 18 of the drawing, the photographic apparatus proper comprises three parts fitting one within the other containing the two dark, light-proof chambers (Figs. 16, 17 and 18), and the mechanism for winding the band of film.

Fig. 17 represents the two small dark chambers $a'$, $a^2$ which are fixed to a plate of metal $b$ upon which the two objectives $b'$ $b^2$ are screwed in appropriate fittings. The plate $b$ comprises an external flange $c$ forming a flat cavity in front of the objectives and intended for the reception of the shutters.

Fig. 16 represents the fitting carrying the mechanism for winding the film consisting of two metal plates $d'$, $d^2$ at right angles. The plate $d'$ carries the supports for the film spools $e'$, $e^2$ and the plate $d^2$ comprises a glass device beneath which the film passes and which keeps it perfectly flat. The chambers $a'$, $a^2$ come between the spools $e'$ $e^2$ against the plates $d'$ $d^2$ and are fixed by a cam device hereinafter described.

The parts $a'$, $a^2$ and $e'$, $e^2$ having been fixed one against the other, the whole is engaged in the box $f$ shown in Fig. 18. This box is formed as a parallelepiped open on two faces, the front face $f'$, $f^2$ comprising grooves $g'$, $g^2$ for the reception of the plate $c$ to which the chambers $a'$, $a^2$ are fixed. These three parts as a whole constitute the photographic apparatus proper which can be mounted on a tripod by means of the conical collar $h$ fitting over a universal joint cone.

The constructional details of this apparatus are represented in Figs. 1 to 5. Figs. 1 to 3 represent the complete apparatus.

Figure 13:
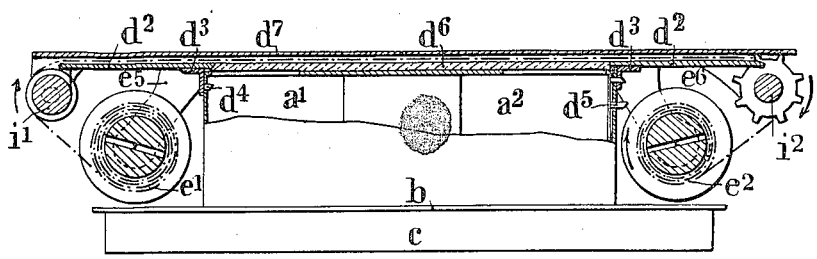
Figure 14:
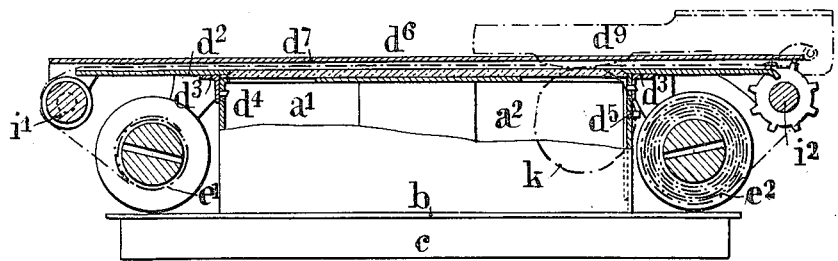

The portion of this apparatus which carries the mechanism for winding and unwinding the film is the mechanism shown in Fig. 16 which is illustrated in section in Figs. 12, 13 and 14. The plate $d'$ carries the two spools $e'$ and $e^2$ which can be operated from the exterior of the apparatus by means of the knobs $e^3$, $e^4$. On the other side these spools are supported by two trunnions mounted by hinges $e^5$, $e^6$ to the plate $d^2$ (Fig. 10). The plate $d'$ also carries two other rollers $i'$, $i^2$ for guiding the film. The roller $i^2$ comprises eight teeth engaging the perforations in the film and effecting a complete revolution when the film advances to the extent of eight perforations. This toothed roller serves to control the passage of the film and to actuate the meter graduated from 0 to 25 which is marked $j$ in Figs. 4 and 8. This meter consists of a wheel $j$ comprising 25 teeth fixed behind the plate $d'$, which presents a small datum mark $j'$ opposite which the 25 teeth come in succession. The shaft of the toothed roller carries a notched wheel $j^2$ which causes the meter to advance to the extent of one tooth when it makes a complete revolution. The shaft of the toothed wheel $j$ is resiliently mounted upon the spring $j^3$ (Fig. 10). Furthermore, the shaft of the toothed roller carries a second wheel $j^4$ presenting a notch $j^5$ in line with the notch $j^2$. This notch $j^5$ permits of stopping the movement of the film when the latter has advanced to the extent of eight perforations, that is to say, when the toothed roller has made a complete revolution and serves also for blocking this film by means of the following device.

Inside the belt $d^3$, the plate $d^2$ is continued by a plane glass plate $d^6$ against which the chambers $a'$, $a^2$ press and behind which the film passes so that it is kept perfectly flat at the printing place.

Behind the glass plate and the film another metal plate $d^7$ is arranged. This plate is resiliently mounted by means of a small spring $d^8$ (Fig. 10) and is able to separate more or less from the glass plate.

The plate $d^7$ is integral with a part $d^9$ (Figs. 4, 8 and 14) carrying a tenon $d^{10}$ which is able to engage in the notch $j^5$ in the wheel $j^4$. One side of the notch $j^5$ forms a slight incline.

In these conditions on commencing to turn the knob $e^3$ from the stop position represented in Fig. 4, the incline of the notch $j^5$ lifts the tenon $d^{10}$ and the part $d^9$ which at the same time lifts the plate $d^7$, and this in separating from the glass plate $d^6$, permits of the feed movement of the film (position shown in Figs. 8 and 14).

When the toothed roller $i^2$ has effected a revolution, that is to say, when the film has advanced to the extent of eight perforations, the tenon $d^{10}$ falls back into the notch $j^5$ and the plate $d^7$ again comes into contact with the film wedging it against the glass plate $d^6$ and preventing it from shifting during the exposure and obliging it to remain perfectly flat.

A second notched wheel $k$ provided with notches $k'$, $k^2$ in which the stop pawl $k^3$ is adapted to engage serves to lift the member $d^9$ which carries the plate $d^7$ while the exposed film is being unwound. To this end the wheel $k$ has a boss $k^4$ which is adapted to engage the member $d^9$ (Figs. 4 and 8).

The two dark chambers $a'$, $a^2$ having been fitted to the part upon which the winding and unwinding mechanisms for the film are fixed, as shown in Figs. 1, 9, 10 and 11, the whole of these parts of the apparatus should be introduced into the box represented in Figs. 5, 6 and 7, so as to constitute the complete apparatus represented in Figs. 1, 2 and 3. In order to do this, the plate $b$ is introduced into the grooves $g'$, $g^2$ formed in the front plates $f'$, $f^2$ and the plate $d'$ completely closes this box. The box is retained therein by a special closing device shown in Fig. 6 which consists of two similar systems $l'$, $l^2$ arranged on each side of the box $f$.

Each closing device comprises a leaf spring $l'$ provided with a small tenon $l^2$ which enter openings $l^3$ formed on the edges of the cover $d'$ (Figs. 7 and 10).

In order to open the apparatus, the springs $l'$ should be separated so that the small tenon $l^2$ frees the edges of the cover $d'$.

This result is obtained by means of a small cam $m$ pivoted at $o$ on the wall of the outer box. This cam is slotted along the line $m'$, $m^2$ and permits the passage of the tenon $l^2$. The thickness of the cam upon the edges of the slot increases from $m'$ to $m^2$ in such a manner that when the cam occupies the position shown in Fig. 3, the springs $l'$ are pressed against the wall of the box. In the position illustrated in Fig. 6, the springs are separated and the tenons $l^2$ release the cover $d'$.

Furthermore, the profile of this cam comprises a protuberance $m^3$ and when the cam passes from the position shown in Fig. 3 to the position in Fig. 6, the protuberance $m^3$ serves to lift the cover $d'$ as shown in Figs. 5 and 6, and facilitates the dismounting of the apparatus by causing the plate $b$ to slide vertically in the grooves $g'$, $g^2$.

Figs. 6$^a$ and 6$^b$ represent a modification of the closing device that has just been described.

In this modification, the cam $m$ is arranged inside the box, as is also the spring $l'$ and the small tenon $l^2$.

The cam acts in the same manner and is actuated by an external knob $o'$ keyed upon the shaft $o$ of the cam.

The apparatus also comprises certain detail devices and accessory elements.

$n$ is a spherical air bubble level.

A sighting box with ground glass or a clear rectifying sighting device is fitted at $p$ between the chambers $a'$ and $a^2$.

The apparatus is loaded in daylight.

The sensitized film is bare throughout its entire length which is approximately one meter and permits of printing 25 pairs of prints. The band is continued at its two ends by two protecting bands of opaque black paper. These bands are not perforated in order to avoid the possibility of distorting the film which might result from the possible coincidence of the perforations in the paper.

The film and its protecting bands are wound upon the spool $e'$ which is arranged between the knob $e^3$ and the hinged trunnion $e^5$ whereupon a portion of the black paper is unwound and caused to pass over the guide $i$ between the glass plate $d^6$ and the movable bottom $d^7$ that has to be separated (position shown in Fig. 12). This paper is caused to pass over the toothed roller $i^2$ and as it is not perforated, the band bears against the extremity of the teeth and maintains the plate $d^7$ lifted during the time occupied by the paper in its passage.

The apparatus is then inclosed in the box $f$ and the latches $l'$ are closed.

The feed of the paper is continued by rotating the knob $e^4$ in the proper direction and notification of the fact that the film is positioned for the first exposure is afforded by its becoming wedged between the bottom $d^7$ and the glass plate $d^6$.

In order to displace the exposed portion of the film, the tenon $d^{10}$ is removed with the finger from the notch $j^5$ whereupon the knob $e^4$ is rotated. The film displaces the toothed roller $i^2$ and the notched wheel $j^4$ which maintains the tenon $d^{10}$ and the plate $d^7$ raised leaving between this plate and the glass plate, a free space for the passage of the film as explained above without the film rubbing upon the glass.

It should be noted that no movement of translation of the film is possible until the tenon $d^{10}$ is disengaged from the notch $j^5$ so that there is no risk of tearing the film in the case of incorrect operation.

Furthermore, the engagement of the tenon $d^{10}$ in the notch $j^5$ has for its object to regulate in a perfectly exact manner the amplitude of the displacement of the band of film in passing from one picture to another.

Fig. 15 represents the manner in which the film is printed. As already stated, if the several contiguous prints are numbered 1, 2, 3, 4, 5...52 it will be found that by advancing the film to the extent of eight perforations at each operation the pairs of prints will be produced in succession at the places 1—4, 3—6, 5—8...45—48, 47—50, 49—52 and that only the places numbered 2 and 51 at the beginning and the end of the film are wasted. It will also be found that a print will never present itself in front of the objectives a second time.

The arrangements described above are given by way of example only and the forms, dimensions, substances and detail arrangements can vary in all cases without affecting the principle of the invention.

What we claim and desire to secure by Letters Patent of the United States is:—

1. The combination of a guideway for a film, one of the members of the guideway being movable toward and away from the other, and film-feeding means, including means to move the movable guide member to clamp and release the film.

2. The combination of a guideway for a film, one of the members of which is movable toward and away from the other, and film-feeding means including means to hold the movable guide member away from the other guide member during the actuation of the film-feeding means and for returning the movable guide member to its normal position to clamp the film in the guideway when the film-feeding means is inactive.

3. The combination of a film guideway, film-feeding means, film-clamping means to hold the film stationary, means included in and actuated by the film-feeding means for holding the film-clamping means released during the operation of the film-feeding means.

4. In an apparatus for feeding and clamping films, the combination of a glass plate against which the film is to be held, a holding plate for holding the film against said glass plate, said holding plate being movable toward and away from the glass plate, a film feeding device, a notched wheel rotatably actuated by the film feeding device, the holding plate being provided with a projection disposed to be received within the notch of the wheel at every turn of the film feeding device, substantially as and for the purpose described.

5. The combination of a glass plate against which a film is to be held, a holding plate for holding the film against the glass plate, said holding plate being movable toward and away from the glass plate, a film feeding device including a wheel having a notch, said holding plate being provided with a projection disposed to engage in the notch of the wheel upon every turn of the film feeding device, an imperforate band constituting a continuation of one end of a film and disposed to bear against the teeth of the toothed feeding member at the beginning of the unwinding of the film whereby to lift the holding plate until the perforations of the film engage the teeth of the feeding device.

6. In an apparatus for feeding and clamping films, the combination of a glass plate against which the film is to be held, a holding plate for holding the film against said glass plate, said holding plate being movable toward and away from the glass plate, a film feeding device, a notched wheel rotatably actuated by the film feeding device, the holding plate being provided with a projection disposed to be received within the notch of the wheel at every turn of the film feeding device, and means for maintaining the holding plate out of engagement with the glass plate.

In testimony whereof we affix our signatures in presence of two witnesses.

LOUIS JOSEPH EMMANUEL COLARDEAU.
JULES RICHARD.

Witnesses:
HANSON C. COXE,
RENÉ THIRIOT.